United States Patent
Duttenhoefer et al.

(10) Patent No.: US 9,709,206 B2
(45) Date of Patent: Jul. 18, 2017

(54) TUBULAR LINER HAVING AN OUTER TUBULAR FILM CONNECTED IN AN OVERLAPPING MANNER BY ADHESIVE TAPE, FOR LINING PIPELINES, AND METHOD FOR MANUFACTURING SAME

(71) Applicant: BRANDENBURGER PATENTVERWERTUNG GbR, Landau (DE)

(72) Inventors: Peter Duttenhoefer, Ilbesheim (DE); Stefan Blenke, Landau/Pfalz (DE)

(73) Assignee: Brandenburger Patentverwertung GbR, Landau (DE)

( * ) Notice: Subject to any disclaimer, the term of this patent is extended or adjusted under 35 U.S.C. 154(b) by 291 days.

(21) Appl. No.: 14/480,839

(22) Filed: Sep. 9, 2014

(65) Prior Publication Data
US 2015/0068636 A1  Mar. 12, 2015

(30) Foreign Application Priority Data
Sep. 9, 2013  (DE) .................... 10 2013 014 796

(51) Int. Cl.
*F16L 55/16* (2006.01)
*F16L 55/165* (2006.01)
(Continued)

(52) U.S. Cl.
CPC .......... *F16L 55/1654* (2013.01); *B29C 53/50* (2013.01); *B32B 1/08* (2013.01); *B32B 3/08* (2013.01); *B32B 3/18* (2013.01); *B32B 7/02* (2013.01); *B32B 7/14* (2013.01); *B32B 27/12* (2013.01); *B32B 27/32* (2013.01); *B32B 37/142* (2013.01); *F16L 11/12* (2013.01); *F16L 55/1656* (2013.01); *B29C 53/582* (2013.01); *B29C 53/60* (2013.01); *B29C 63/10* (2013.01);
(Continued)

(58) Field of Classification Search
CPC ............. F16L 55/165; F16L 55/1651–55/1654
USPC .................. 138/98, 97; 156/264; 405/184.2; 428/34.5, 34.6
See application file for complete search history.

(56) References Cited

U.S. PATENT DOCUMENTS

| | | | |
|---|---|---|---|
| 4,521,465 A | 6/1985 | Schröer et al. | |
| 5,186,987 A * | 2/1993 | Imoto | B32B 5/26 138/128 |

(Continued)

FOREIGN PATENT DOCUMENTS

| | | |
|---|---|---|
| EP | 0100029 A1 | 2/1984 |
| WO | 0073692 A1 | 12/2000 |
| WO | 2012065698 A2 | 5/2012 |

*Primary Examiner* — Patrick F Brinson
(74) *Attorney, Agent, or Firm* — Laurence A. Greenberg; Werner H. Stemer; Ralph E. Locher

(57) ABSTRACT

A tubular liner for the lining of pipelines has an inner tubular film, a layer of fibrous material arranged on the inner tubular film, and an outer tubular film which is arranged on the outer side of the fibrous material and is impermeable to UV light. The tubular liner is distinguished in that the outer tubular film has a radially inward peripheral portion and a second peripheral portion bearing on the outer side of the first peripheral portion in an overlapping region. The peripheral portions are connected to one another by an adhesive tape which extends across the longitudinal direction of the tubular liner. A method is also provided for manufacturing such a tubular liner.

5 Claims, 6 Drawing Sheets

(51) Int. Cl.
 *B32B 37/14* (2006.01)
 *F16L 11/12* (2006.01)
 *B32B 7/02* (2006.01)
 *B32B 7/14* (2006.01)
 *B32B 27/12* (2006.01)
 *B32B 27/32* (2006.01)
 *B32B 1/08* (2006.01)
 *B32B 3/08* (2006.01)
 *B29C 53/50* (2006.01)
 *B32B 3/18* (2006.01)
 *B29L 23/00* (2006.01)
 *B29D 23/00* (2006.01)
 *B29C 53/58* (2006.01)
 *B29C 53/60* (2006.01)
 *B29C 63/10* (2006.01)

(52) U.S. Cl.
 CPC ......... *B29D 23/00* (2013.01); *B29L 2023/006* (2013.01); *B32B 2260/021* (2013.01); *B32B 2260/046* (2013.01); *B32B 2262/101* (2013.01); *B32B 2307/41* (2013.01); *B32B 2307/71* (2013.01); *B32B 2597/00* (2013.01)

(56) References Cited

U.S. PATENT DOCUMENTS

| | | | | |
|---|---|---|---|---|
| 5,698,056 | A * | 12/1997 | Kamiyama | B29C 65/5042 138/98 |
| 6,117,507 | A * | 9/2000 | Smith | B29C 47/0004 138/97 |
| 6,296,729 | B1 * | 10/2001 | Kamiyama | B29C 66/4322 138/98 |
| 6,612,340 | B1 * | 9/2003 | Lause | F16L 55/1651 138/97 |
| 6,679,966 | B1 | 1/2004 | Brandenburger | |
| 6,732,763 | B2 * | 5/2004 | Williamson | F16L 55/1656 138/125 |
| 6,923,217 | B2 * | 8/2005 | Smith | F16L 55/1656 138/124 |
| 2010/0012214 | A1 * | 1/2010 | Kamiyama | F16L 55/1656 138/98 |

* cited by examiner

TUBULAR LINER HAVING AN OUTER TUBULAR FILM CONNECTED IN AN OVERLAPPING MANNER BY ADHESIVE TAPE, FOR LINING PIPELINES, AND METHOD FOR MANUFACTURING SAME

CROSS-REFERENCE TO RELATED APPLICATION

This application claims the priority, under 35 U.S.C. §119, of German application DE 10 2013 014 796.4, filed Sep. 9, 2013; the prior application is herewith incorporated by reference in its entirety.

BACKGROUND OF THE INVENTION

Field of the Invention

The invention relates to a tubular liner having an outer tubular film connected in an overlapping manner by adhesive tape, for lining pipelines, and a method for manufacturing same.

In the field of trenchless rehabilitation of defective pipelines, such as defective sewer pipes or sewer ducts, tubular liners, referred to as "inliners" and containing a fibrous material, in particular of fiberglass fabrics, impregnated with a liquid reactive resin which, after insertion of the tubular liner into the pipeline and expansion of the tubular liner by use of compressed air, is cured by light from a radiation source, are increasingly being employed. Such a tubular liner and a method for manufacturing same are known from international patent disclosure WO 00/73692 (corresponding to U.S. Pat. No. 6,679,966), for example, the tubular liner described therein having an inner tubular film onto which, while a fibrous layer which is surrounded by an outer tubular film is being formed, the resin-impregnated fibrous tapes are wound in an overlapping manner onto a mandrel.

It is furthermore known from European patent application EP 0 100 029 A1 (corresponding to U.S. Pat. No. 4,521,465) that the inner tubular film used for a tubular liner is produced by applying a non-thermoplastic polyurethane-urea coating and a thermoplastic polyurethane-urea coating superimposed thereon to a web-like textile material in the form of a polyester non-woven material and to stitch together the longitudinal edges of the film. The seam is then sealed by a thermally weldable or optionally also adhesively bondable film strip. The document makes no reference to how connecting the two longitudinal edges of the coated textile material and the application of the film strip occur in detail.

Furthermore, the applicant submitting the present invention is aware of a method and a device for manufacturing a tubular liner having an endless inner tubular film with a non-woven layer laminated thereon, as disclosed in international patent disclosure WO 2012/065698, in which tubular liner the longitudinal edges on the inner side of the tubular film in the overlap region are covered by a film tape which is adhesively bonded or welded thereto. Despite the film tape providing a substantially air-tight welding seam which effectively prevents the emission of styrene vapors from the layer of resin-impregnated fibrous tapes which surrounds the inner tubular film, welding-on of the film tape requires the introduction of two welding seams, as a result of which the production effort is increased and the production speed is correspondingly decreased. The document makes no reference to also arranging the outer tubular film so as to lie tightly around the fibrous tape layer by way of applying an adhesive tape in an overlapping region.

Furthermore, aforementioned tubular liners in which the outer tubular film is produced by thermal welding of a lower film web and an upper film web which is impermeable to UV light by two lateral plastic-welding devices which are concomitantly moved along linearly laterally at the indexing speed of the continuously produced tubular fibrous tape and which weld together the peripheral portions of the upper and lower film webs guided on top of one another on both sides of the fibrous tube and lying flat on top of one another are made in-house by the applicant. Here, the problem arises that, as opposed to overlapping seams, the peel seams being created on both sides of the completed outer tubular film can only be exposed to significantly lower shear forces on expansion of the tubular liner, complicating calibration of the diameter of the tubular liner in the duct prior to curing. Moreover, after insertion of the tubular liner into a duct and expansion of the tubular liner, the connecting portions which project wing-like from both sides of the completely welded outer tubular film overlap in a folding manner between the inner wall of the duct and the outer side of the tubular liner. In the case of tubular liners having small inner diameters and small wall thicknesses, the crease-like overlaps of the wing-like connecting portions that are being created may be disadvantageously visible as objectionable distortions on the inner wall of the completely cured tubular liner.

SUMMARY OF THE INVENTION

Accordingly, it is an object of the present invention to provide a tubular liner having an inner tubular film, a layer of resin-impregnated fibrous material arranged thereon, as well as an outer tubular film which is applied on the layer of fibrous material, which can be manufactured in a cost-effective manner and with high quality and which avoids the aforementioned disadvantages of the prior art.

According to the invention a tubular liner for the lining of pipelines, in particular of defective ducts, contains an inner tubular film on which a layer of fibrous material which is impregnated with a liquid reactive resin which cures by way of radiation with UV light is arranged. On the outer side of the fibrous material, which is preferably composed of individual fibrous tapes which are wound in a manner overlapping one another over a mandrel, an outer tubular film which is composed of a film material which is impermeable to UV light is arranged.

The tubular liner according to the invention is distinguished in that it has a first radially inward peripheral portion and a second peripheral portion bearing on the outer side of the first peripheral portion in an overlapping region. According to the invention, the two overlapping peripheral portions are connected to one another by an adhesive tape which extends across the longitudinal direction of the tubular liner, which adhesive tape is preferably unrolled from above with its adhesive side onto the overlapping peripheral portions during the continuous production of the tubular liner.

By way of the invention the advantage is derived that the two peripheral portions are connected to one another by the adhesive tape in the manner of an overlapping seam, on account of which, in contrast to a peel seam, a significantly higher tensile and/or tearing strength in response to tensile forces acting on the two peripheral portions in the circumferential direction results. Tensile forces of this type acting in the circumferential direction of the adhesively bonded tubular liner arise in particular during expansion of the tubular liner by use of compressed air which is introduced into the tubular liner after it has been inserted in the folded-up state into a duct to be rehabilitated. A particular advantage is offered here in that the adhesive bonding of the peripheral portions of the outer tubular film in the overlapping region also has a high shear strength when cost-effective adhesive tape which is coated on one side with a permanently adhesive layer is used, making it possible for the circumference of the tubular liner, when being expanded by way of increasing or decreasing the pressure of the employed compressed air, to be calibrated to a desired value. Here, the outer tubular film which is impermeable to UV light and is circumferentially closed to form an endless tube, acts as a counter bearing, so to speak, for the layer of fibrous material, the wound fibrous tapes of which may be displaced in relation to one another and, on account thereof, allow flaring of the fibrous layer in the radial direction when introducing compressed air.

In the preferred embodiment of the invention the outer tubular film has a first upper circumferential portion which is preferably composed of a first film web which is unrolled from above onto the fibrous layer. The outer tubular film furthermore has a second lower circumferential portion which is composed of a second film web which is guided from below up to the layer of fibrous tape. Guiding of the second film web up to the layer of fibrous tape here preferably takes place via a deforming unit, in particular a known shaping shoulder, over which the second film web which is drawn off from a roll is guided in such a manner that the longitudinal peripheries are folded over around the lateral regions of the fibrous tube, which is preferably lying flat, such that on the first circumferential portion a first and a second radially outward peripheral portion are formed and, corresponding thereto, on the second circumferential portion a first and second radially inward peripheral portion are formed. The width of the first and second film web here is chosen such that the two peripheral regions of the circumferential portions overlap in a region of preferably 10 mm to 50 mm, such that it is ensured that no UV light can penetrate the fibrous material from the outside and that the liquid reactive resin contained therein can cure early. In order to connect to one another the first circumferential portion and the second circumferential portion in the two overlapping regions and to thereby form the two film webs so as to be a circumferentially closed outer tubular film, according to the invention an adhesive tape which is adhesive on one side, preferably a fabric tape, which is preferably rolled from a roll from above onto the overlapping regions and pressed onto the upper side of the tubular liner, for example via a pressing device, for example a brush or a presser roller, is adhesively attached in the two overlapping regions over the film peripheries.

In the preferred embodiment of the invention the first circumferential portion has a circumferential width which is smaller than the circumferential width of the second, preferably the lower circumferential portion. The width of the first circumferential portion that corresponds to the width of the infed film web here is preferably between 60 and 90% of the circumferential width of the second circumferential portion. On account thereof the advantage is derived that the two longitudinal peripheries of the second circumferential portion, after folding over, can be reliably arranged with sufficient overlap over the corresponding peripheral portions of the first circumferential portion, when the fibrous tube, after leaving the mandrel and the infeed of the lower second film web, is moved along a support surface at a substantially constant indexing speed in a flattened shape.

In order to connect the first and the second circumferential portions to one another it is provided in the preferred embodiment of the invention to infeed a single adhesive tape that has the same or preferably also a slightly larger width than the first circumferential portion and extends across the two overlapping regions. On account of infeeding only one adhesive tape of larger width the advantage is derived that, despite the higher material costs for the adhesive tape associated therewith, the logistical outlay is reduced and the risk of errors when infeeding the adhesive tape is reduced.

According to a further concept on which the invention is based, the adhesive tape contains a first and a second adhesive portion as well as a tensioning portion which connects the two adhesive portions to one another and which is located above the overlapping region. The tensioning portion is preferably a thermoplastic material, for example a thermoplastic film, such as a polyethylene film, for example, which, under the influence of heat, contracts in the circumferential direction in such a manner that the first adhesive portion is moved in the direction of the second adhesive portion. Such an adhesive tape having a first and second adhesive portion as well as a tensioning portion which connects the two adhesive portions to one another may be obtained, for example, by adhesively attaching two single strips of adhesive tape onto the peripheral regions of such a strip-shaped thermoplastic material, for example a film strip. This may take place either continuously by placing the thermoplastic film strip over the folded-over peripheral regions of the second circumferential portion and subsequently applying the adhesive tape, or by prior tailoring of such a strip having two laterally adhesively attached adhesive tapes. On account of this embodiment of the invention the advantage is derived that the outer tubular film, by way of introducing heat, for example by a hot air blower, can be brought to bear with a desired tension on the outer side of the fibrous material. On account thereof a defined crease-free bearing which forms an effective counter bearing, the outer diameter of which can be adjusted with high precision, when expanding the tubular liner in a duct to be rehabilitated, is achieved.

In order to obtain, in the afore-described embodiments of the invention, an improved sealing of the overlap region to emissions of environmentally harmful styrene which is employed as a solvent in many reactive resins, it is provided according to one further embodiment of the invention that between the first peripheral portion and the second peripheral portion, in the overlapping region, additionally at least one layer of adhesive, which forms a barrier to the discharge of resin and also of styrene vapors from the overlapping region, is arranged. The layer of adhesive is preferably applied as a continuous bead of adhesive of molten hot-melt adhesive onto the upper side of the radially outward peripheral portion, that is to say, in the case of the second afore-described embodiment, onto preferably both lateral peripheral portions of the first circumferential portion prior to the two lateral peripheral portions of the second circumferential portion being folded over onto the first peripheral portions. On account of the employment of such a bead of hot-melt adhesive which, after having folded over the lateral peripheral portions of the lower second circumferential portion, cools within the shortest of timeframes, the advantage is obtained that any creases which may be created during folding-over of the peripheral portions are filled and equalized, such that the risk of any discharge of liquid reactive resin through creases of this type when folding up the tubular liner is further reduced and the risk of any discharge of reactive resin onto the outer side of the overlapping region onto which the adhesive tape is adhesively attached for connecting the peripheral regions of the first circumferential portion and the second circumferential portion is thereby reduced.

According to another concept on which the invention is based, in the method according to the invention for manufacturing an aforedescribed tubular liner, in order to arrange a continuous layer of fibrous material on the inner tubular film, a fibrous tape impregnated with at least one reactive resin which is preferably curable by UV light is wound screw-like in an overlapping manner onto an inner tubular film which is guided over a mandrel. Here, preferably a plurality of different layers of fibrous tapes are wound on top of one another, in order to produce the layer of fibrous material.

The method according to the invention is distinguished in that the film web is continuously infed and, during infeeding, the two peripheral portions, via a guide unit, are guided around the circumference of the layer of fibrous material. Here, guiding around takes place in such a manner that in the case of a one-part film web, in at least one overlapping region, the radially outward peripheral portion bears on the outer side of the radially inward peripheral portion. An adhesive tape which is preferably likewise continuously infed from a roll and which preferably by half, with one side, spans the overlapping region and, with its other side, spans the adjacent peripheral region of the radially inward outer side of the second peripheral portion, such that the two peripheral portions are connected to one another in an overlapping manner in the fashion of an overlapping seam and, on account thereof, a circumferentially closed outer tubular film of UV-impermeable material is continuously produced from the one-part film web, is adhesively attached onto the two peripheral portions lying on top of one another. While the outer tubular film, in the simplest embodiment of the invention in the case of tubular liners having small diameters, for example having diameters of less than 30 cm, in principle may also be formed in the afore-described manner from a single film-web portion, in the preferred embodiment of the invention the outer tubular film is assembled from a first upper and a second lower circumferential portion which are correspondingly provided in the shape of two continuously infed film webs. Here, the first circumferential portion, in the shape of the first film web, is continuously unrolled onto the upper side of the layer of fibrous material, and the second lower circumferential portion of the outer tubular film is preferably likewise continuously guided from the opposite side, that is to say preferably from below, via the guide unit around the layer of fibrous material. The first circumferential portion and the second circumferential portion here have such a width that, in a first and second overlapping region, the two peripheral portions of the second circumferential portion lie flat on top of one another on the respective upper side of the first circumferential portion. The first circumferential portion and the first peripheral region of the second circumferential portion are then connected to one another by a first strip of adhesive tape which is adhesively attached onto the first overlapping region and the second peripheral region of the first circumferential portion and the second peripheral region of the second circumferential portion are connected to one another by a second strip of adhesive tape which is adhesively attached to the second overlapping region. The first and second strips of adhesive tape here cover preferably by half the respective overlapping region and the adjacent radially outward exposed peripheral region of the first circumferential portion.

In order to guide the associated film web, in the two afore-described embodiments of the invention, around the respective peripheral regions of the wound tube of fibrous material—also referred to in the following as fibrous tube—which is preferably indexed at a continuous speed and which bears flat on a support surface, the guide unit preferably contains a first revolving brush belt which contacts the outer side of the film web and, in the direction toward the free peripheral portion, with its bristles brushes over the folded-over peripheral portion of the film web that bears on the upper side of the fibrous tube. Here, the outer side of the inward peripheral portion of the one-part film web in the region of the upper side may be forced against the fibrous tube, for example by a brush wheel or a presser roller, while the revolving brush belt, preferably counter to gravity in the upward direction over the first peripheral portion, brushes the second peripheral portion, which lies on top.

In the preferred embodiment of the invention in which the outer tubular film is obtained by adhesively bonding a first and a second film web, preferably at least two revolving, preferably belt-like brushing units which substantially symmetrically approach exclusively in the peripheral portions the upper side of the folded-over peripheral portions of the tube of fibrous tape which is preferably laid out in a flat manner are employed. Here, only the peripheral regions, but not the first circumferential portion, are contacted. The revolving directions of the brush belts approaching the outer side of the film web here are counter to one another and such that the two free peripheral portions of the second circumferential portion are impinged by a tensile force in the direction of the center of the first circumferential portion that simultaneously tensions the second film web and guides it around the outer side of the tube of fibrous tape. By modifying the angle and/or the length of the contact region and/or the pressing force of the respective revolving brush belt as well as the revolving speed relative to the indexing speed of the fibrous tube, a substantially homogenous crease-free bearing of the second film web on the outer side of the layer of fibrous material can be obtained here, such that, after connecting the first and second circumferential portions by applying the two strips of adhesive tape a tubular liner of which the outer tubular film bears in a tight and almost crease-free manner on the outer side of the layer of resin-impregnated fibrous material is obtained. Since, in this case, the brush belts make sure that the second film web, which is infed from below, is guided around the peripheral portions of the inward tube of fibrous material, which is preferably guided as a flat web on a support surface, and on account of its weight is prevented from slipping off, on account of the employment of at least two brush belts revolving in opposite directions the advantage is derived of being able to entirely dispense with a shaping shoulder of steel sheet material that is sometimes complex to manufacture. In this case, the outer side of the fibrous tube which is being continuously produced by winding serves here as a counter bearing for the brush belts, wherein inhomogeneities in the material being created during infeeding of the fibrous material are compensated for in an advantageous manner by the elasticity of the bristles of the brush belts.

Finally, it may also be provided in the last-described embodiment of the method according to the invention that, prior to adhesively attaching the adhesive tapes, or the one strip of adhesive tape, respectively, which preferably has the same width as the first circumferential portion, a continuous bead of molten hot-melt adhesive which, after guiding the lateral peripheral portions on top of one another, cools in the overlapping regions and hereby fills any inhomogeneities being created, is applied onto the outer sides of the first circumferential portion, such that an additional barrier which effectively prevents discharge of solvent vapors from the reactive resin is provided.

Other features which are considered as characteristic for the invention are set forth in the appended claims.

Although the invention is illustrated and described herein as embodied in tubular liner having an outer tubular film connected in an overlapping manner by adhesive tape, for lining pipelines, and method for manufacturing same, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
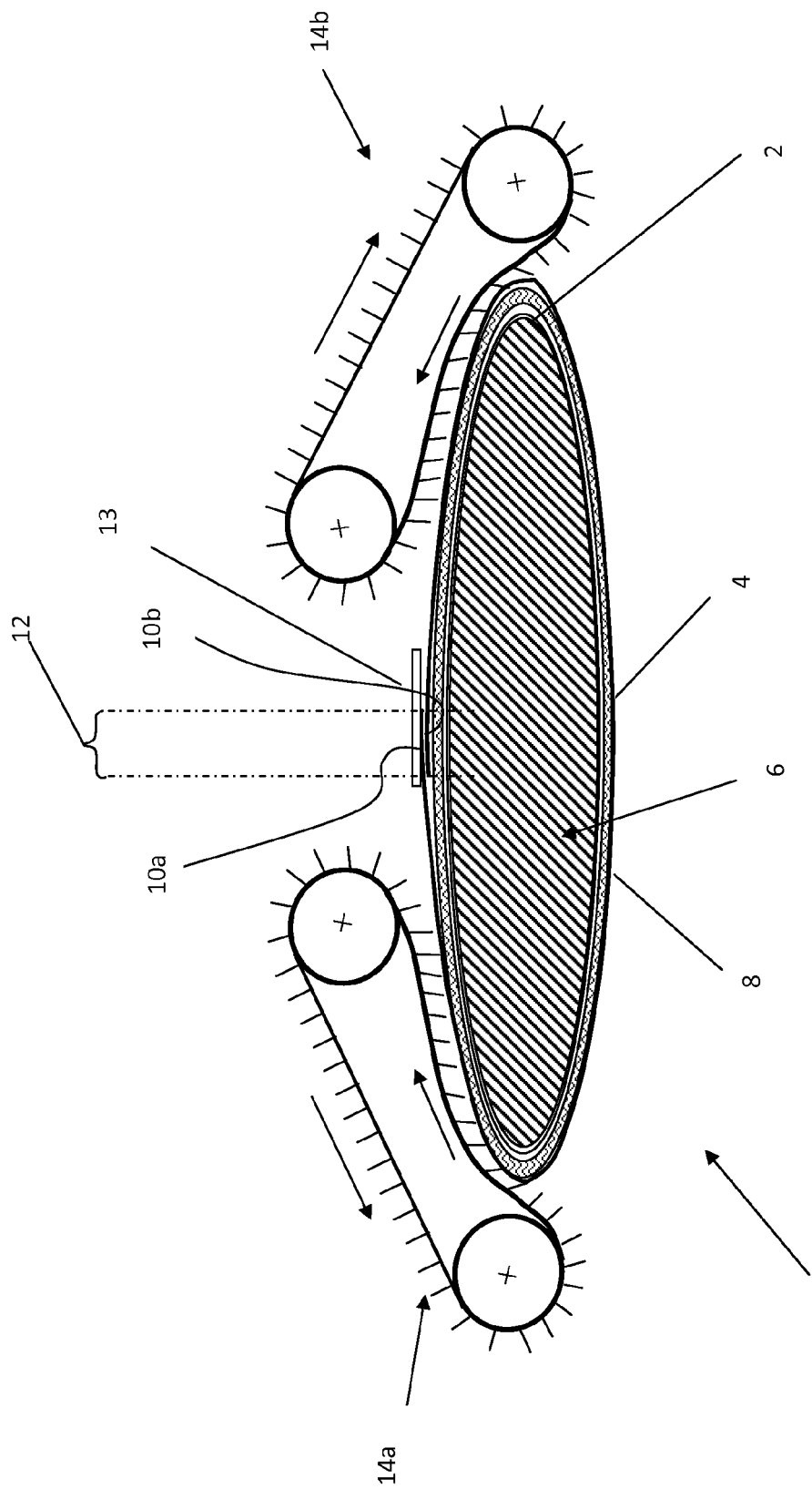
FIG. 1 is a diagrammatic cross-sectional view through a tubular liner according to the invention, during manufacturing thereof on an indicated mandrel, in which tubular liner an outer tubular film is assembled from a single infed film web.

Referring now to the figures of the drawings in detail and first, particularly to FIG. 1 thereof, there is shown a tubular liner 1 which has an inner tubular film 2 on which at least one layer of fibrous material 4, in particular of fibrous tapes 4a which are impregnated with a reactive resin which is curable by UV light, is arranged. As can be further obtained from FIG. 3 which shows the manufacturing method for the tubular liner 1 according to the invention, the fibrous tapes 4a are wound onto the inner tubular film 2 by a winding device which has a mandrel 6, as is described in international patent disclosure WO 007/73692, for example. On the outer side of the layer of fibrous material 4 an outer tubular film 8 which, in the embodiment shown in FIG. 1, is composed of a single plastic film which is impermeable to UV light and which is infed as a one-part endless film web on the lower side and is formed by folding over the film peripheries onto the upper side of the fibrous material, is arranged. Here, in an overlapping region 12, a radially inward peripheral portion 10b comes to lie on a radially outward peripheral portion 10a. In order to subsequently connect the two peripheral portions 10a and 10b so as to form a circumferentially closed outer tubular film 8, a one-sided adhesive tape 13 is adhesively attached from above, preferably by half, onto the two mutually overlapping peripheral portions, such that a seam which is similar to an overlapping seam and which has high tensile strength in relation to forces which act in the circumferential direction of the outer tubular film is created. In order to fold the plastic film from which the outer tubular film 8 is formed around the peripheral portions of the tube of fibrous material 4 that is sometimes still guided on the mandrel 6, revolving brushing units 14a and 14b which are schematically indicated in FIG. 1 and which may have, for example, polyamide bristles which, proceeding from the peripheries, brush across the upper side of the folded-over film web toward the overlapping region 12, are preferably provided. The revolving speed of the two brush belts 14a, 14b as well as their angle in relation to the conveying direction V of the outer tubular film here is preferably such that air inclusions located under the folded-over film web are brushed out toward the overlapping region, such that the film web of the outer tubular film 8 bears in a tight manner on the outer side of the fibrous material 4.

Figure 2A:
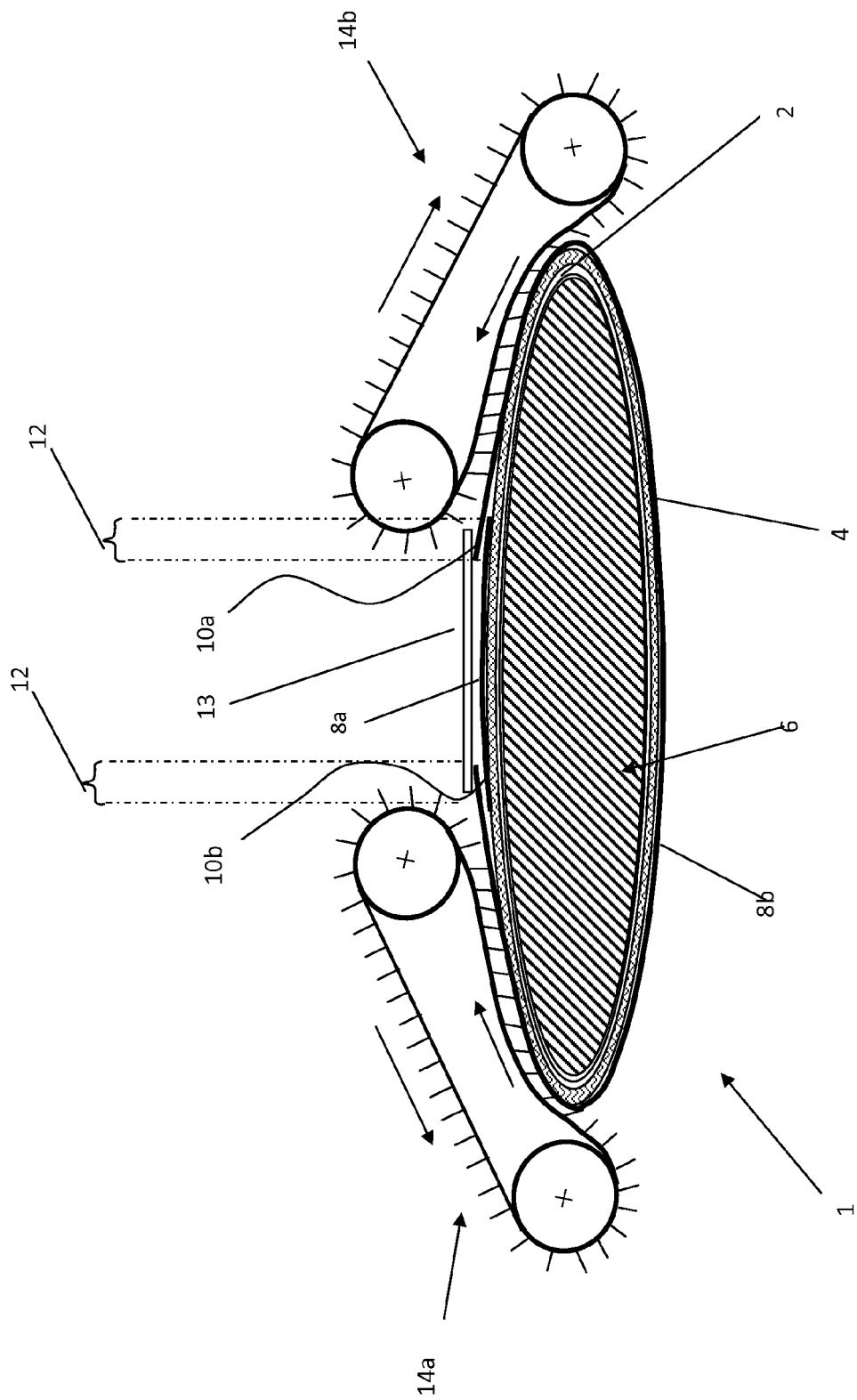
FIG. 2A is a diagrammatic cross-sectional view of a second embodiment of the invention, in which the outer tubular film contains a first and a second circumferential portion which are connected to one another by adhesively bonding a first and second infed film by a single strip of adhesive tape.
Figure 2B:
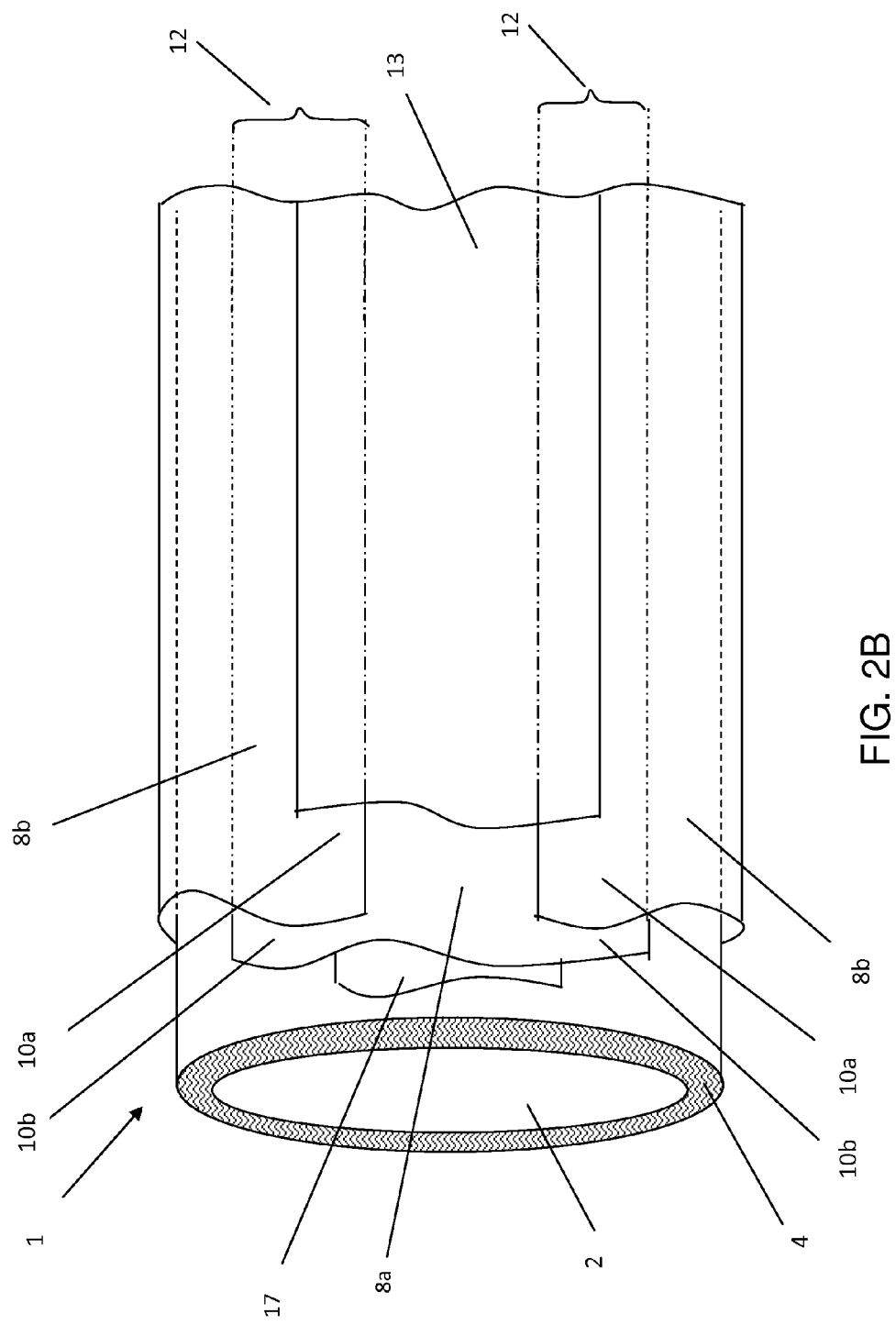
FIG. 2B is a diagrammatic perspective view onto the tubular liner according to FIG. 2A, having an additional longitudinal pull strap.
Figure 3:
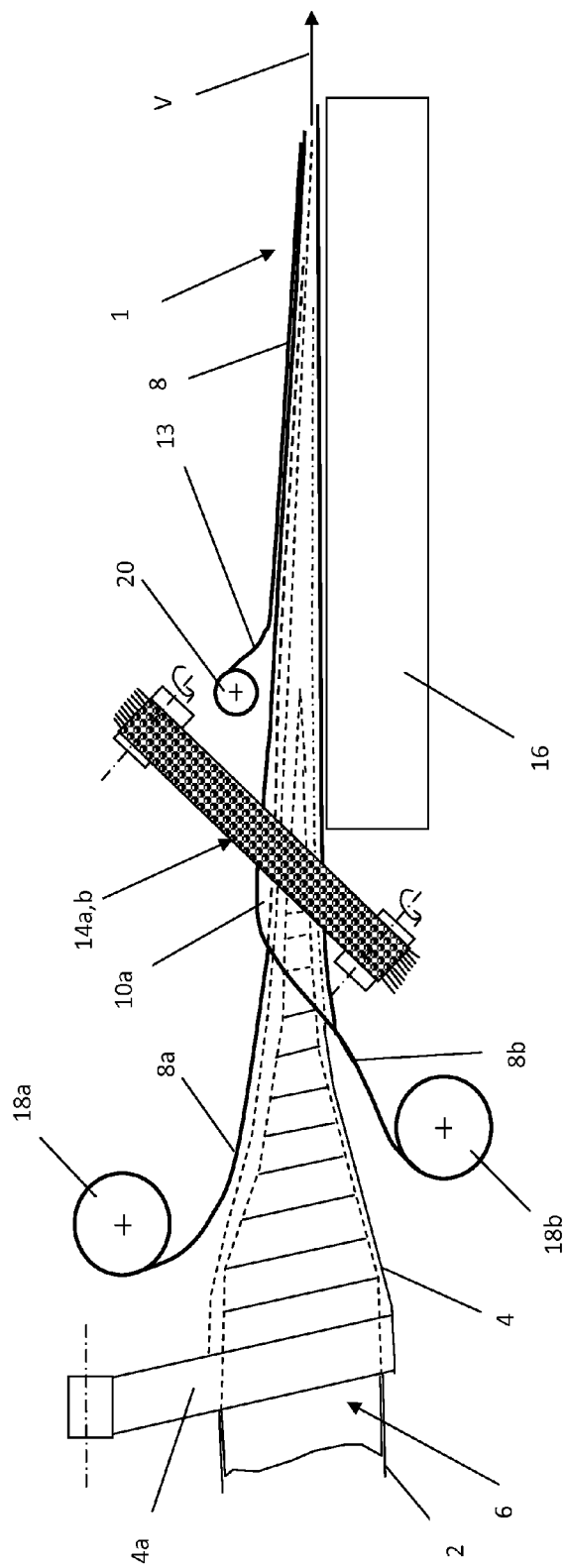
FIG. 3 is a diagrammatic, lateral view of a tubular liner according to the invention, which is continuously produced on a mandrel, having a first and/or a second circumferential portion which is/are infed in the shape of film webs.

In the embodiment of the invention shown in FIGS. 2A and 2B the tubular liner 8 according to the invention contains a first circumferential portion 8a which is preferably infed as an endless film web from above onto the tube of fibrous material 4, that has been previously continuously produced and that is moved, proceeding from the mandrel 6, at its indexing speed V over a support surface 16 which is fixed to the frame. The film web of the first circumferential portion 8a here may be unrolled from a roll 18a, for example, as is indicated in FIG. 3.

The outer tubular film 8 furthermore contains a second circumferential portion 8b which is preferably unrolled from a second roll 18b which is located on the lower side of the infed tube of fibrous material 4. In order to fold the two peripheral portions of the lower film web 8b around the tube of fibrous material 4 here, the peripheral portions are acted upon in an upward direction by way of a guide unit (not shown in more detail), for example a known shaping shoulder or else by two brushing units 14a and 14b indicated in FIG. 2A and FIG. 3. On account thereof the right-hand, radially inward peripheral portion 10b and left-hand, radially inward peripheral portion 10b (both in FIG. 2A) of the second circumferential portion 8b come to lie on the in each case radially outward peripheral portion 10a of the first circumferential portion 8a. Subsequently, a single strip of adhesive tape 13 is adhesively bonded onto the upper side of the two overlapping regions 12 being created, the strip of adhesive tape having such a width that the first circumferential portion 8a is completely spanned thereby, covering here the peripheral portions, lying on the top, of the second circumferential portion, that is to say of the second infed film web 8b, by, for example, 1 to 5 centimeters.

Figure 2C:
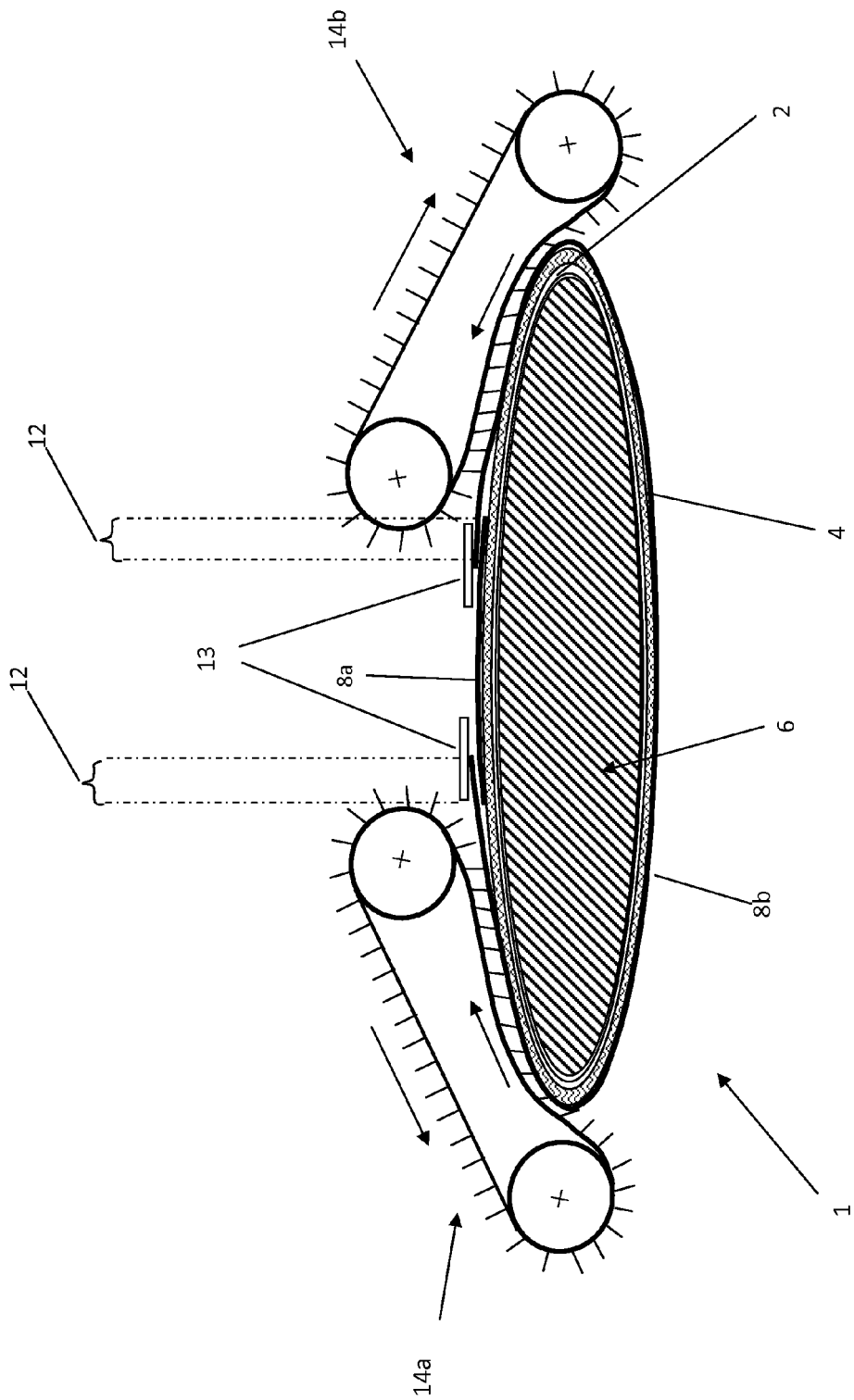
FIG. 2C is a diagrammatic cross-sectional view of a further embodiment of the tubular liner according to the invention, in which the outer tubular film contains a first and second circumferential portion, the peripheral regions of which are in each case connected to one another by an adhesive tape rolled thereon.
Figure 2D:
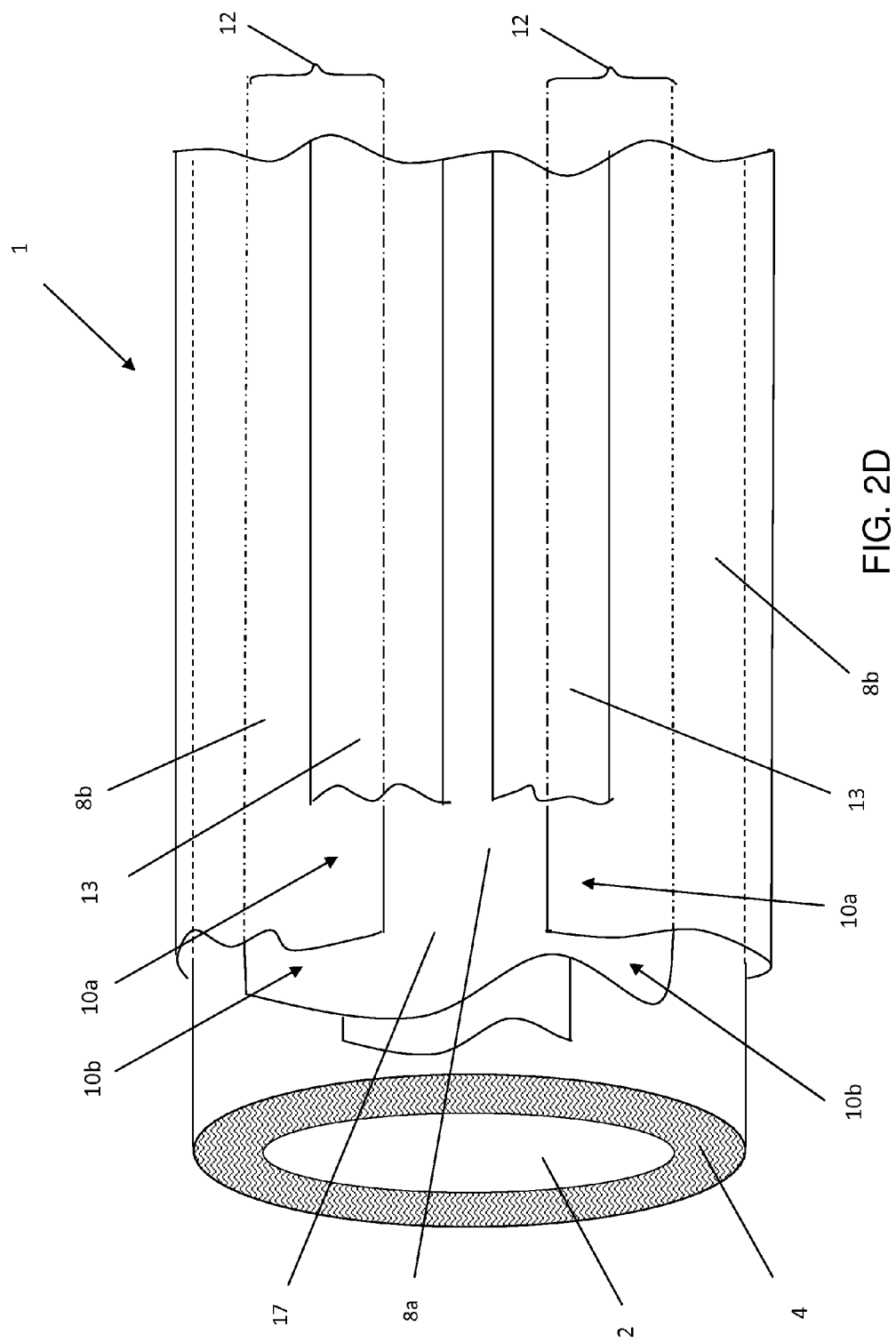
FIG. 2D is a diagrammatic, perspective view onto the tubular liner according to FIG. 2C.

In order to prevent the screw-like windings of the tube of fibrous tapes 4a wound screw-like in an overlapping manner from falling apart during insertion of the completed tubular liner 1 into a duct (not shown in more detail), a longitudinal pull strap 17, for example a tape of fiberglass fabric, which is schematically indicated only in FIGS. 2B and 2D and which, prior to infeeding of the film web for the first circumferential portion 8a, is unrolled onto the upper side of the tube of fibrous material 4 via an additional roller, is preferably arranged below the first circumferential portion 8a of the outer tubular film 8. For reasons of clarity, the longitudinal pull strap is not shown in the remaining figures.

The web-like material for forming the first and the second circumferential portions 8a, 8b, on the inner side facing the fibrous material 4, is preferably provided with a non-woven material which, preferably as a polyester non-woven material, is already laminated onto the inner side of the first and second circumferential portions 8a, 8b during manufacturing of the film web. On account of the brushing units 14a, 14b which approach the upper side of the second circumferential portion 8b and which optionally may additionally also approach the lower side of the first circumferential portion and in each case brush across the latter proceeding from the center toward the lateral peripheries, in conjunction with a non-woven layer which is arranged on the inner side of the film material of the first and second circumferential portions, a taut and bubble-free bearing of the film material on the layer of fibrous material 4 that is impregnated with liquid reactive resin can be obtained.

According to the embodiment of the invention shown in FIGS. 2C and 2D, it is alternatively possible to use two narrow strips of adhesive tape 13 instead of a preferably employed single wide strip of adhesive tape which spans the entire free portion between the two outward peripheral portions of the second circumferential portion, which two narrow strips of adhesive tape, similarly to the embodiment shown in FIG. 1, preferably only cover the two peripheral regions by half and are infed as endless adhesive-tape material from a roll 20 in the same manner as the film webs for the two circumferential portions 8a, 8b.

The following is a summary list of reference numerals and the corresponding structure used in the above description of the invention:
1 Tubular liner according to the invention
2 Inner tubular film
4 Layer of resin-impregnated fibrous material
4a Fibrous tape
6 Winding device/mandrel
8 Outer tubular film
8a First circumferential portion
8b Second circumferential portion
10a Radially inward peripheral portion
10b Radially outward peripheral portion
12 Overlap region
13 Adhesive tape
14a First brushing unit
14b Second brushing unit
16 Support surface
17 Longitudinal pull strap
18a Roll having film web for the first circumferential portion
18b Roll having film web for the second circumferential portion
20 Roll of adhesive tape
V Indexing speed

The invention claimed is:

1. A tubular liner for lining of pipelines, the tubular liner comprising:
an inner tubular film;
a layer of fibrous material disposed on said inner tubular film and having an outer side;
adhesive tape; and
an outer tubular film disposed on said outer side of said layer of fibrous material and being impermeable to UV light, said outer tubular film having peripheral portions including a radially inward first peripheral portion and a radially outward second peripheral portion bearing on an outer side of said radially inward first peripheral portion in an overlapping region, said peripheral portions connected to one another by said adhesive tape extending across a longitudinal direction of the tubular liner, said outer tubular film having a first and a second circumferential portion, wherein on said first circumferential portion said radially inward first peripheral portion is formed and includes first and second inward first peripheral portions, corresponding to first and second outward peripheral portions of said second radially outward peripheral portion formed on said second circumferential portion, which overlap in first and second overlapping regions and are connected to one another by said adhesive tape extending and being adhesively attached in the longitudinal direction.

2. The tubular liner according to claim 1, wherein said first circumferential portion has a circumferential width which is between 60 and 90% of a circumferential width of said second circumferential portion.

3. The tubular liner according to claim 1, wherein said first circumferential portion and said second circumferential portion are connected to one another by a single strip of said adhesive tape that has a same or a larger width than said first circumferential portion and extends across said first and second overlapping regions.

4. The tubular liner according to claim 1, wherein said adhesive tape contains first and second adhesive portions as well as a tensioning portion which connects said first and second adhesive portions to one another and which is disposed above said first and second overlapping regions and said adhesive tape is composed of a thermoplastic material which, under an influence of heat, contracts in a circumferential direction in such a manner that said first adhesive portion is moved in a direction of said second adhesive portion.

5. The tubular liner according to claim 1, further comprising a cooled hot-melt adhesive, said peripheral portions, in said first and second overlapping regions, are additionally connected to one another by at least one layer of said cooled hot-melt adhesive, which extends in the longitudinal direction of the tubular liner.

* * * * *